(12) United States Patent
Viswanathan et al.

(10) Patent No.: US 10,481,739 B2
(45) Date of Patent: Nov. 19, 2019

(54) OPTICAL STEERING OF COMPONENT WAVELENGTHS OF A MULTI-WAVELENGTH BEAM TO ENABLE INTERACTIVITY

(71) Applicant: Microvision, Inc., Redmond, WA (US)

(72) Inventors: P. Selvan Viswanathan, Bellevue, WA (US); Roeland Collet, Olympia, WA (US); George Thomas Valliath, Winnetka, IL (US); Jari Honkanen, Monroe, WA (US); Matthieu Saracco, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 190 days.

(21) Appl. No.: 15/044,174

(22) Filed: Feb. 16, 2016

(65) Prior Publication Data
US 2017/0235429 A1    Aug. 17, 2017

(51) Int. Cl.
*G06F 3/00* (2006.01)
*G06F 3/042* (2006.01)
*G02B 27/14* (2006.01)
*G06F 3/01* (2006.01)

(52) U.S. Cl.
CPC ......... *G06F 3/0423* (2013.01); *G02B 27/141* (2013.01); *G06F 3/017* (2013.01)

(58) Field of Classification Search
CPC ........ G06F 3/0423; G06F 3/17; G02B 27/141
See application file for complete search history.

(56) References Cited

U.S. PATENT DOCUMENTS

| 5,422,758 | A  | * | 6/1995  | Lawson  | G02B 27/144 359/629 |
|-----------|----|---|---------|---------|---------------------|
| 8,018,579 | B1 | * | 9/2011  | Krah    | G01B 11/00 356/4.01 |
| 8,519,983 | B2 | * | 8/2013  | Sprague | G06F 3/03542 345/179 |
| 2002/0021287 | A1 | * | 2/2002 | Tomasi | G06F 1/1613 345/168 |
| 2006/0289760 | A1 | * | 12/2006 | Bathiche | G02B 5/282 250/332 |
| 2013/0215235 | A1 | * | 8/2013 | Russell | G03B 35/00 348/47 |
| 2017/0068375 | A1 | * | 3/2017 | Plumb | G06F 3/0416 |

* cited by examiner

*Primary Examiner* — Stephen S Hong
*Assistant Examiner* — Marshon L Robinson
(74) *Attorney, Agent, or Firm* — Kevin D. Wills (57) ABSTRACT

Briefly, in accordance with one or more embodiments, an information handling system comprises a scanning system to scan one or more component wavelength beams into a combined multi-component beam in a first field of view, and a redirecting system to redirect one or more of the component wavelength beams into a second field of view. A first subset of the one or more component wavelength beams is projected in the first field of view and a second subset of the one or more component wavelength beams is projected in the second field of view. The first subset may project a visible image in the first field of view, and user is capable of providing an input to control the information handling system via interaction with the second subset in the second field of view.

19 Claims, 11 Drawing Sheets

FIG. 12

OPTICAL STEERING OF COMPONENT WAVELENGTHS OF A MULTI-WAVELENGTH BEAM TO ENABLE INTERACTIVITY

BACKGROUND

Interactivity with projected content including gestures and/or virtual touch is evolutionary and may be accomplished in many ways including but not limited to Retroreflection and various depth sensing techniques (viz., Triangulation, Structured Light, Time of Flight (TOF), etc.). Spatially resolving the intruding object such as a finger, hand, stylus, and so on, yields information that can be packetized and passed on to the host OS as a touch or mouse event for example. Unlike a physical touchscreen, projected content poses a unique dilemma. Interacting with projected content by hovering in the projection cone or projection field of view (FOV) would cause image occlusion to the user or viewer because of the intruding object being between the projector and projection surface. This would give rise to shadows that might be undesirable in certain use cases. Further, the physical environment might also be non-conducive to such interaction.

For example, the projector may be an ultra-short throw one where the projected image is on a surface that is not easily accessible to the user or, even if accessible, the shadows created cover large sections of the projected content. If the projector were ceiling mounted, large portions of the projection cone or FOV might be entirely inaccessible and, even if accessible, might only be accessible when the user is very close to the projection screen. In the case of an automotive head up display (HUD), the projection cone or FOV might be entirely inaccessible, or the placement might be non-ergonomic for interactivity or lead to safety concerns. In the case of eyewear such as augmented or virtual reality eyewear, the region between the projector and image surface might be inaccessible or, if accessible, would cause occlusion or eclipsing most of the projected content. In a standard scenario with a projector set on a table, the use case might deem the projection cone or FOV cumbersome to interact with or altogether inaccessible.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
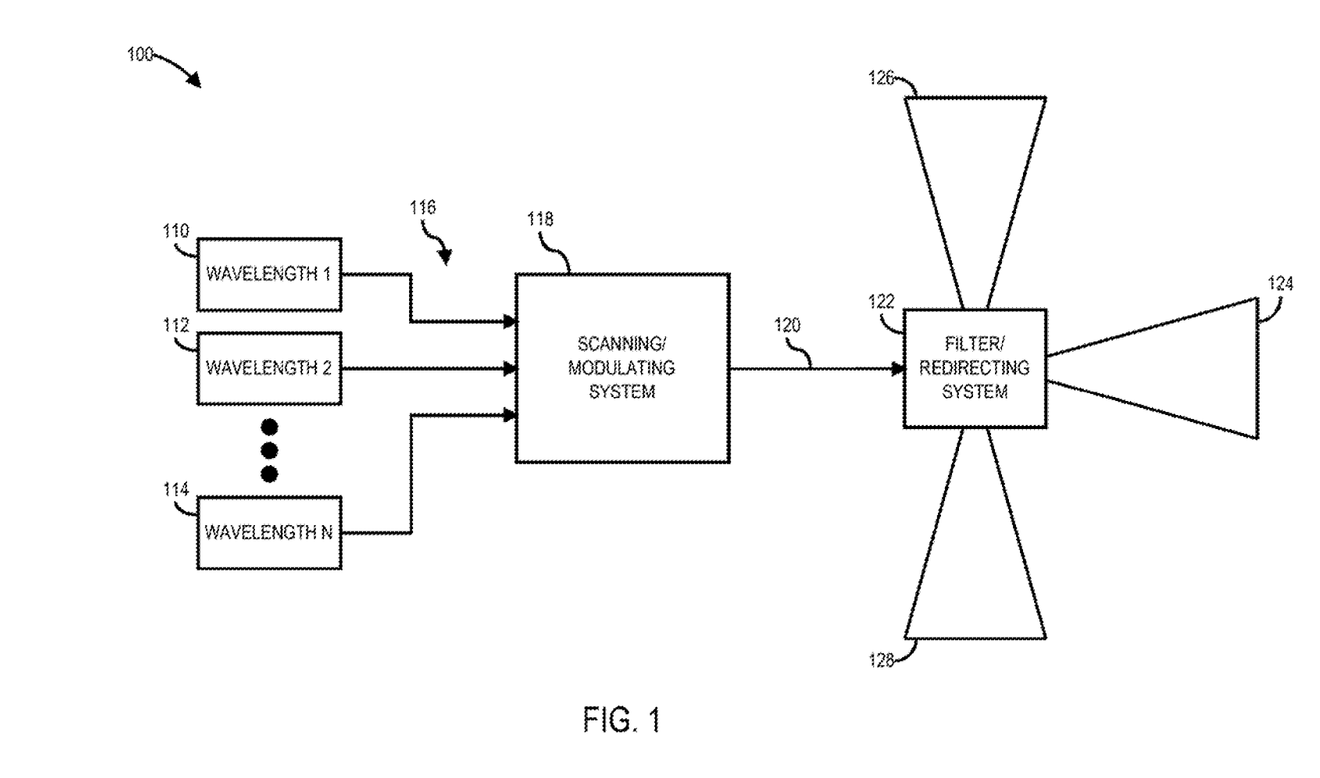
FIG. 1 is a diagram of an information handling system capable of optically steering component wavelengths of a multi-wavelength beam in accordance with one or more embodiments.

Referring now to FIG. 1, a diagram of an information handling system capable of optically steering component wavelengths of a multi-wavelength beam in accordance with one or more embodiments will be discussed. As shown in FIG. 1, information handling system 100 may comprise multiple beam sources, for example light source 110 having a first wavelength, light source 112 have a second wavelength, up to an Nth light source 114 having an Nth wavelength. The beams 116 from the light sources may be scanned and/or modulated by a scanning/modulation system 118 to emit a multi-component beam 120, for example to generate one or more regions of projected content (viz., images or video) and/or to generate one or more regions of user interactivity. In some embodiments, interactivity may refer to manipulation of objects or other elements displayed within an image, and also may also involve scene acquisition, up to a certain depth, and then conditionally processing the acquisition as an input to affect behavior of the displayed image and/or the objects or elements within the display image, or other interaction. Where the scene in the field or fields of view (FOV) is acquired, for example using time of flight (ToF) techniques, such acquisition may be considered as three-dimensional (3D) imaging or depth mapping. Thus, one more regions and/or viewports may be created to provide any of the functions of image projection, image acquisition, or interactivity, alone or in various combinations, and the scope of the claimed subject matter is not limited in these respects. In accordance with one or more embodiments, information handling system 100 may include a beam filter and redirecting system 122 to filter the components of one or more wavelength components of the multi-component beams into one or more fields of view (FOV) such as FOV 124, FOV 126, and/or FOV 128. The FOVs may be designed, for example, to split image projection into one or more FOVs, and user interactivity regions into one or more other FOVs so that the user may interact with image content displayed in one FOV by interacting with another FOV so as to not interfere with or otherwise occlude the projected image (static) or video (dynamic) content.

In one or more embodiments, information handling system 100 comprises circuitry, hardware, and/or optical components to combine 1 to N channels of light from 1 to N light sources having any number or combination of component wavelengths including both visible light such as red, green, or blue (RGB) wavelengths and infrared (IR) or near-IR, or ultraviolet (UV) or near-UV wavelengths. The beams 116 of the multiple wavelengths may be combined together into a multi-component beam 120. The combined multi-component beam 120 may be scanned or otherwise projected out of the information handling system. Beam scanning or projection may be accomplished with a scanning/modulation system 118, for example via a raster scanning system with a one-mirror or a multi-mirror laser beam scanner (LBS), or where component wavelengths may be time-multiplexed out of the information handling system 100 such as a digital micromirror device (DMD) array or other panel based solutions or spatial light modulators.

In one or more embodiments, one or more selected wavelengths of the combined multi-component beam 120 may be modulated, scanned, filtered, and/or redirected to create a visible projected image in a first field of view (FOV) 124. Typically, red, green, and blue (RGB) wavelengths may be selected together to form a full-color visible image in a first FOV 124. One or more other selected wavelengths of the combined multi-component beam 120 may be modulated, scanned, filtered, and/or redirected to form one or more regular arrays or irregular arrays of photo impulses that facilitate depth sensing and/or user interaction in a second FOV 126. In one embodiment, a near-IR wavelength may be utilized to form a pattern in-band or out-of-band to the visible projected image, and a detector and associated circuitry may measure the Time-of-Flight (TOF) of the reflected photo impulses to yield a depth map of the second FOV 126. The depth map may then be analyzed by an appropriate processor to extract information of an intruding object such as a finger, a hand, or a stylus, to pass gesture and/or touch interaction information to an operating system either running on the information handling system 100, or running on an external device coupled to the information handling system 100. While ToF is stated above as a method of scene acquisition and enabling interactivity, the scope of this invention is not limited by that. Other methods such as Retroreflection for example as shown and described in U.S. Pat. No. 8,519,983 may also be used for interactivity. Said U.S. Pat. No. 8,519,983 is hereby incorporated herein by reference in its entirety.

In one or more embodiments, a component wavelength or a group of component wavelengths may be optically separated from the multi-component beam 120, and the selected component wavelengths may be steered or otherwise redirected separately from the other components of the multi-component beam 120. In one example embodiment, the visible wavelengths may exit the information handling system 100 in a nominal direction such as in FOV 124 to allow for projection of an image onto a projection screen or projection surface, and one or more IR wavelengths may be employed for depth sensing and may be separated from the visible wavelengths and made to exit via another FOV 126. Examples of how component beam wavelengths may be split into different FOVs is described in further detail, below.

Figure 2:
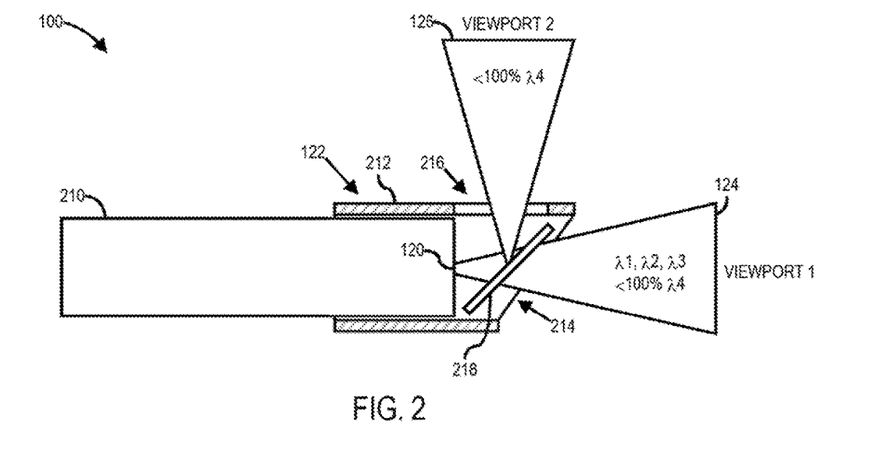
FIG. 2 is a diagram of an information handling system as shown in FIG. 1 with an external apparatus to implement beam steering and wavelength selection accordance with one or more embodiments.

Referring now to FIG. 2, a diagram of an information handling system as shown in FIG. 1 with an external apparatus to implement beam steering and wavelength selection in accordance with one or more embodiments will be discussed. As shown in FIG. 2, information handling system 100 may include a housing 210 in which the various components may be contained. The filter/redirecting system 122 may comprise an external attachment 212, for example that extends over an end of the housing to capture the multi-component beam 120 generated by information handling system 100 as shown in FIG. 1. In the embodiment shown in FIG. 2, the external attachment 212 may include a beam splitter 218 having properties to be transmissive to one or more wavelength components of the multi-component beam 120 such that those wavelengths pass through the beam splitter 218 in FOV 124 at viewport 1. The beam splitter 218 also may be reflective to one or more wavelength components of the multi-component beam 120 such that those wavelengths are reflected off the beam splitter 218 FOV at viewport 2. The viewports may comprise a window in which certain functionality is made available and is dictated by the wavelengths transmitted through the viewports. For example, if wavelengths $\lambda 1$, $\lambda 2$, and $\lambda 3$ are the visible wavelengths, and $\lambda 4$ is an infrared (IR) wavelength used for depth sensing, then in the example shown in FIG. 2 viewport 1 will have a visible projected image as well as some depth sensing functionality, and viewport 2 will have only depth sensing functionality. The ratio of split and steering of the wavelengths may be governed by the optical filter coatings applied to the beam splitter 218. The number of wavelengths used for image projection and for depth sensing or other auxiliary functions is not limited to the examples shown in FIG. 2, and the scope of the claimed subject matter is not limited in these respects. It should be further noted that the beam splitter 218 as shown in FIG. 2 is merely one example of device that provides optical filtering, steering and/or redirecting functions, and other optical devices similarly may be utilized such as diffraction gratings, prisms, lenses, and so on, and the scope of the claimed subject matter is not limited in this respect.

It should be noted that the external attachment 212 may have exit ports formed therein, for example exit port 214 to accommodate FOV 124 and exit port 216 to accommodate FOV 128, wherein the exit ports may align with the respective view ports. Thus, in one example, a first wavelength component may exit the information handling system 100 in FOV 124 to project an image onto a projection surface wherein the projected image is viewable by a user, and the user may interact with content in the projected image via interaction in FOV 126 wherein the interaction does not interfere with the ability of the user to view the content of the projected image.

Figure 3:
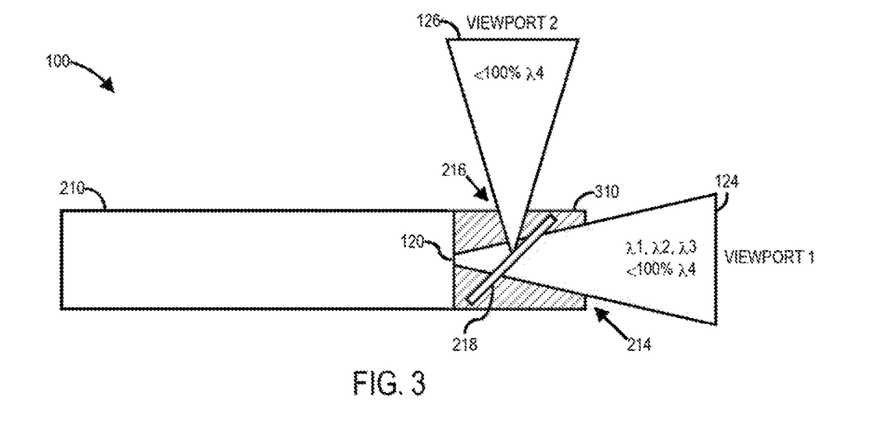
FIG. 3 is a diagram of the information handling system as shown in FIG. 1 with an integrated apparatus to implement beam steering and wavelength selection in accordance with one or more embodiments.

Referring now to FIG. 3, a diagram of the information handling system as shown in FIG. 1 with an integrated apparatus to implement beam steering and wavelength selection in accordance with one or more embodiments will be discussed. The embodiment shown in FIG. 3 is substantially similar to the embodiment shown in FIG. 2, above, except that instead of the filter/redirecting system 122 being contained in an external attachment 212, the filter/redirecting system 122 is integrated within portion 310 of the housing 210 of the information handling system 100.

Figure 4:
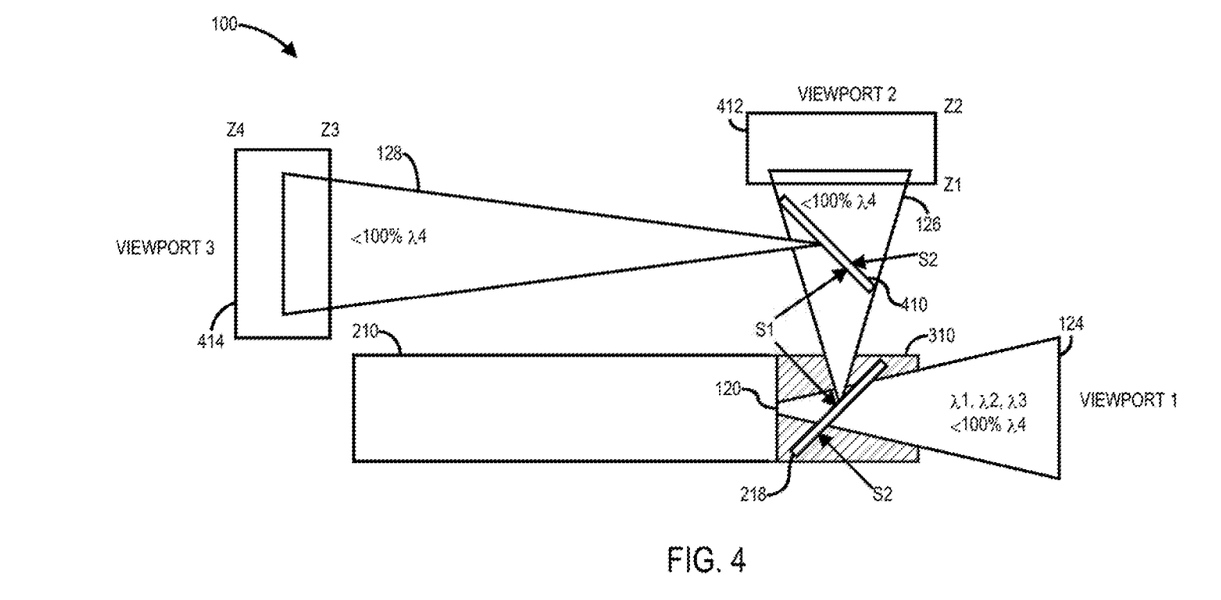
FIG. 4 is a diagram of the information handling system as shown in FIG. 1 illustrating multiple action areas in accordance with one or more embodiments.

Referring now to FIG. 4, a diagram of the information handling system as shown in FIG. 1 illustrating multiple action areas in accordance with one or more embodiments; The embodiment shown in FIG. 4 may be substantially similar to the embodiments shown in FIG. 2 or FIG. 3, except that a third viewport, viewport 3 may be provided. In the embodiment shown in FIG. 4, the wavelength of light redirected to viewport 2 further may be split and steered or otherwise redirected to FOV 128 and to viewport 3. The ratio of the split and steering of the wavelengths once again may be determined by an optical filter coating on a second beam splitter, beam splitter 410. Although FIG. 4 shows a fraction of one wavelength, λ4, that appears at viewport 2 and another fraction of the same wavelength, λ4, appear at viewport 3, such an arrangement is not a constraint of the design. Any number of wavelengths may be split and steered or redirected at each beam splitter into any number of viewports, and the scope of the claimed subject matter is not limited in these respects. In the illustrations, the beamsplitters are shown to be nominally angled at about 45 degrees, but the scope of the claimed subject matter is not limited to this angle.

For example, as shown in FIG. 4, a projected image with depth sensing may be provided in viewport 1, and depth sensing fields such as field 412 and field 414 may be available in viewport 2 and viewport 3, thereby enabling three regions of interactivity that all may relate to the same projected content in viewport 1. If depth sensing is accomplished via Time of Flight (TOF) techniques, the reflection of the IR impulse in each viewport may be a portion of the diffuse spread from a Lambertian surface which can either be redirected back to a photodetector in information handling system 100 via the beam splitters via appropriate filter coating selection, or alternatively to a secondary mirrored surface or lens in front of a photodetector coupled to the housing 210. Although FIG. 4 shows discrete planar beam splitters for purposes of example and discussion, other types of filtering and/or beam redirecting devices may be utilized, and the scope of the claimed subject matter is not limited in these respects. As shown in FIG. 4, the beam splitters may include a first side, S1, that corresponds to an impinging beam, and a second side, S2, that corresponds to an exiting beam. The beam splitters may be any device that may be designed and built for a particular application, for example in applications involving optically distorting or correcting the viewport such as keystone correction, viewport expansion, compression, and/or warping, and so on, or having multiple filtering and/or redirecting elements in an articulated joint or mount. In addition, mirroring of the addressable interactivity regions within a viewport which might arise depending on the beam splitter optical train may be corrected electronically when modulating the relevant wavelength.

In one or more embodiments that employ TOF depth sensing, the detected distance could be accurate from each viewport. As a result, virtual bands within each viewport may be provided that would facilitate a separate or distinct action. Actions detected within a spatial region such as field 412 may be designed to be constrained by the depth Z1 to depth Z2. Thus, actions detected within field 412 may be treated as touch events on a virtual track pad. Similarly, actions detected within distances between depth Z3 and depth Z4, where depth Z3>>depth Z2, may be treated as other gestures. In such a design, a visible image may be projected into viewport 1 with the user sitting at viewport 3. From viewport 3, situated behind the information handling system 100, the user may interact using gestures. By positioning a finger right over viewport 2, the user may interact with a virtual track pad. The virtual gating thus described may be performed by providing bands based on a function of depth. Alternatively, gating with wavelengths may be performed. If two IR wavelengths are provided, and the beams splitters channeled only one of the IR wavelength each to either viewports 2 or viewport 3, then using a separate photodetector that is coated to only receive either of the IR wavelengths, the action performed in one viewport may be translated in a manner that is different than reflections performed in the other viewport. An example of such a TOF depth sensing arrangement is shown in and described with respect to FIG. 7, below. Various other arrangements and/or configurations of information handling system 100 may be provided to implement the concepts described herein or other concepts or applications, and the scope of the claimed subject matter is not limited in these respects. Examples of how the beam splitters realize wavelength filtering and/or redirection are shown in and described with respect to FIG. 5 and FIG. 6, below.

Figure 5:
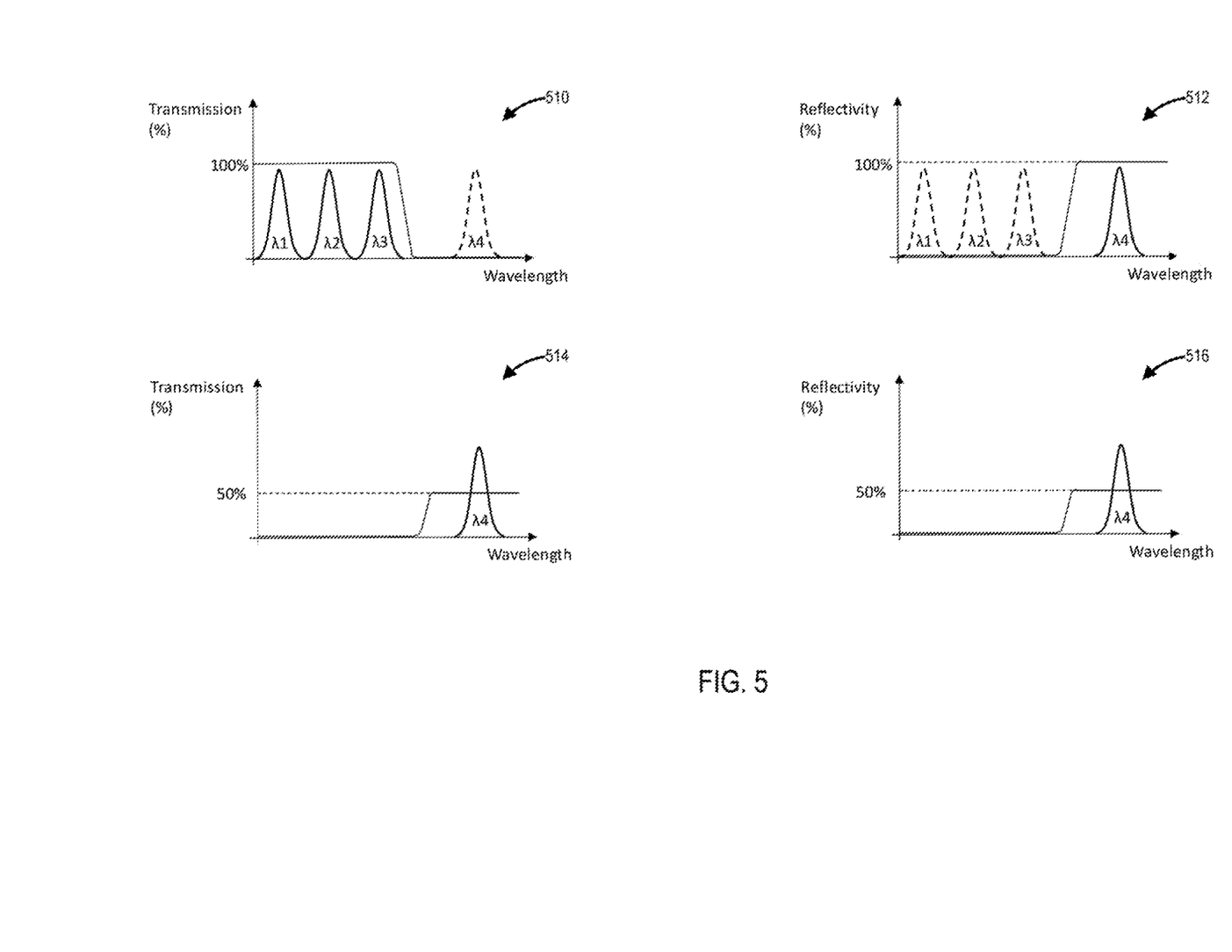
FIG. 5 and FIG. 6 are diagrams of wavelength filtering and transmission examples for multi-wavelength beam selection in accordance with one or more embodiments.
Figure 6:
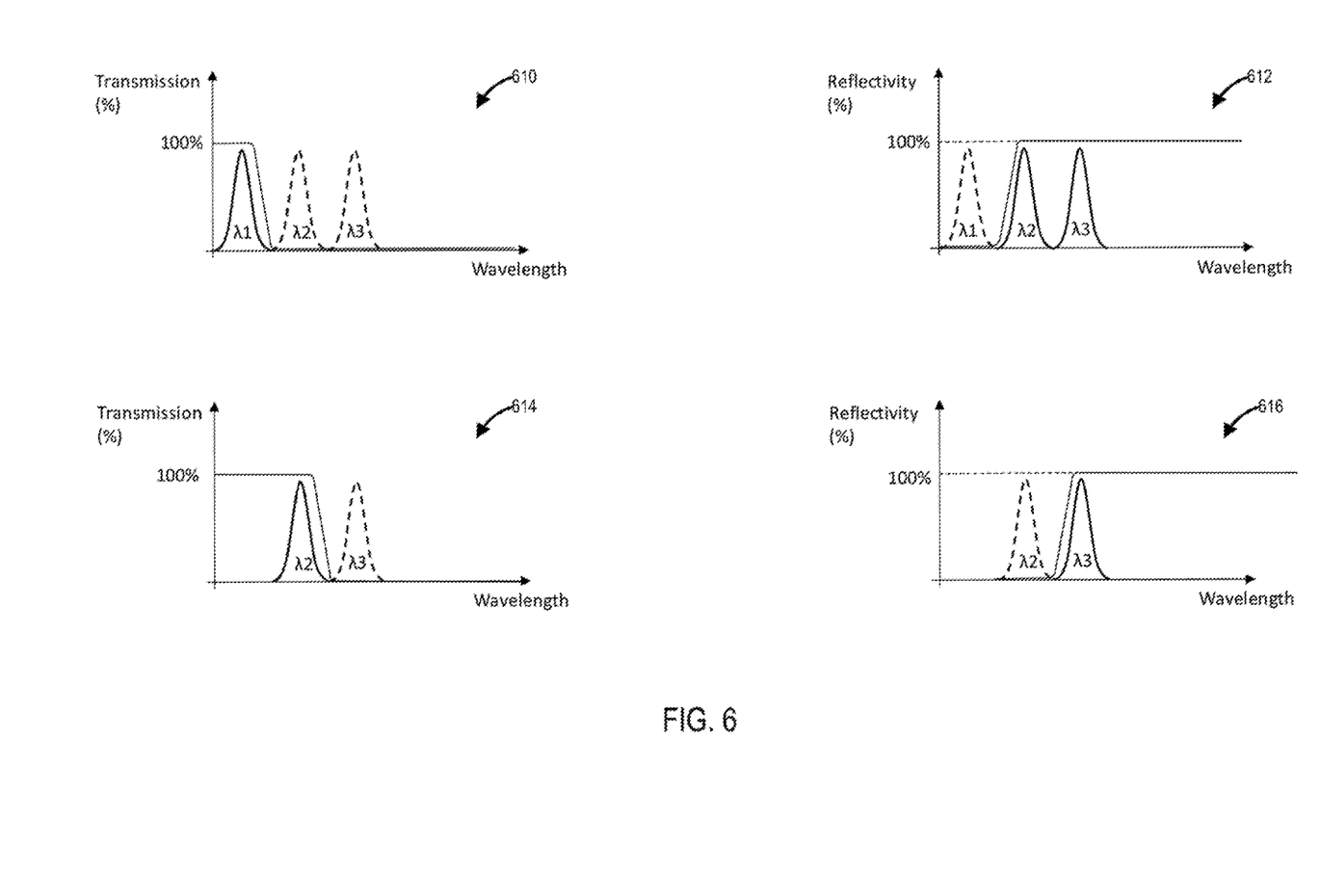

Referring now to FIG. 5 and FIG. 6, diagrams of wavelength filtering and transmission examples for multi-wavelength beam selection in accordance with one or more embodiments will be discussed. As shown in FIG. 4, above, the beam splitters may include a first surface, S1, that corresponds to an impinging beam, and a second surface, S2, that corresponds to an exiting beam. In one example shown in FIG. 5, a first filter coating may be applied to side S1 of beam splitter 218. The first filter may have transmission properties as a function of wavelength as shown in graph 510 and reflectivity properties as a function of wavelength as shown in graph 512. The first filter may be transmissive for wavelengths λ1, λ2, and λ3, but reject wavelength λ4, such that wavelengths λ1, λ2, and λ3 are observed at viewport 1. The first filter coating may be reflective for wavelength λ4 such that wavelength λ4 is observed in viewport 2. In another example, a second filter coating may be applied to side S1 of beam splitter 410 having transmission properties as a function of wavelength as shown in graph 514 and reflectivity properties as a function of wavelength as shown in graph 516. The second filter may transmit approximately 50% of the energy of wavelength λ4 to provide approximately 50% of the energy of wavelength λ4 in viewport 2. The second filter also may reflect approximately 50% of the energy of wavelength λ4 to provide approximately 50% of the energy of wavelength λ4 in viewport 3. In some embodiments, high pass filters, low pass filters, or notch filters may be designed to accommodate the spectrum width of the filtered wavelengths, for example as shown by the slope filter cutoff edges, in order to avoid loss in the system and/or to avoid transmitting or reflecting residual wavelength components or spectrum tails inadvertently in the wrong viewport. The filters themselves may have two surfaces. The performances shown in FIG. 5 and FIG. 6 are for the first surface of the filter. The second surface may comprise a broadband anti-reflective coating, although the scope of the claimed subject matter is not limited in these respects.

In another example shown in FIG. 6, the first filter may have transmission properties as shown in graph 610, and reflectivity properties as shown in graph 612. The first filter may be transmissive for wavelength λ1 but not for wavelengths λ2 and λ3. As a result, wavelength λ1 may be provided in viewport 1 but not wavelengths λ2 and λ3. The first filter also may reflect wavelengths λ2 and λ3 but not wavelength λ1. The second filter may be transmissive for wavelength λ2 but not for wavelength λ1. The second filter also may be reflective for wavelength λ3 but not for wavelength λ2. As a result, wavelength λ2 may be provided in viewport 2 but not wavelength λ3, and wavelength λ3 may be provided in viewport 3 but not wavelength λ2. It should be noted that the filter properties discussed herein are merely examples, wherein other properties and arrangements of filters may be provided, and the scope of the claimed subject matter is not limited in these respects.

Figure 7:
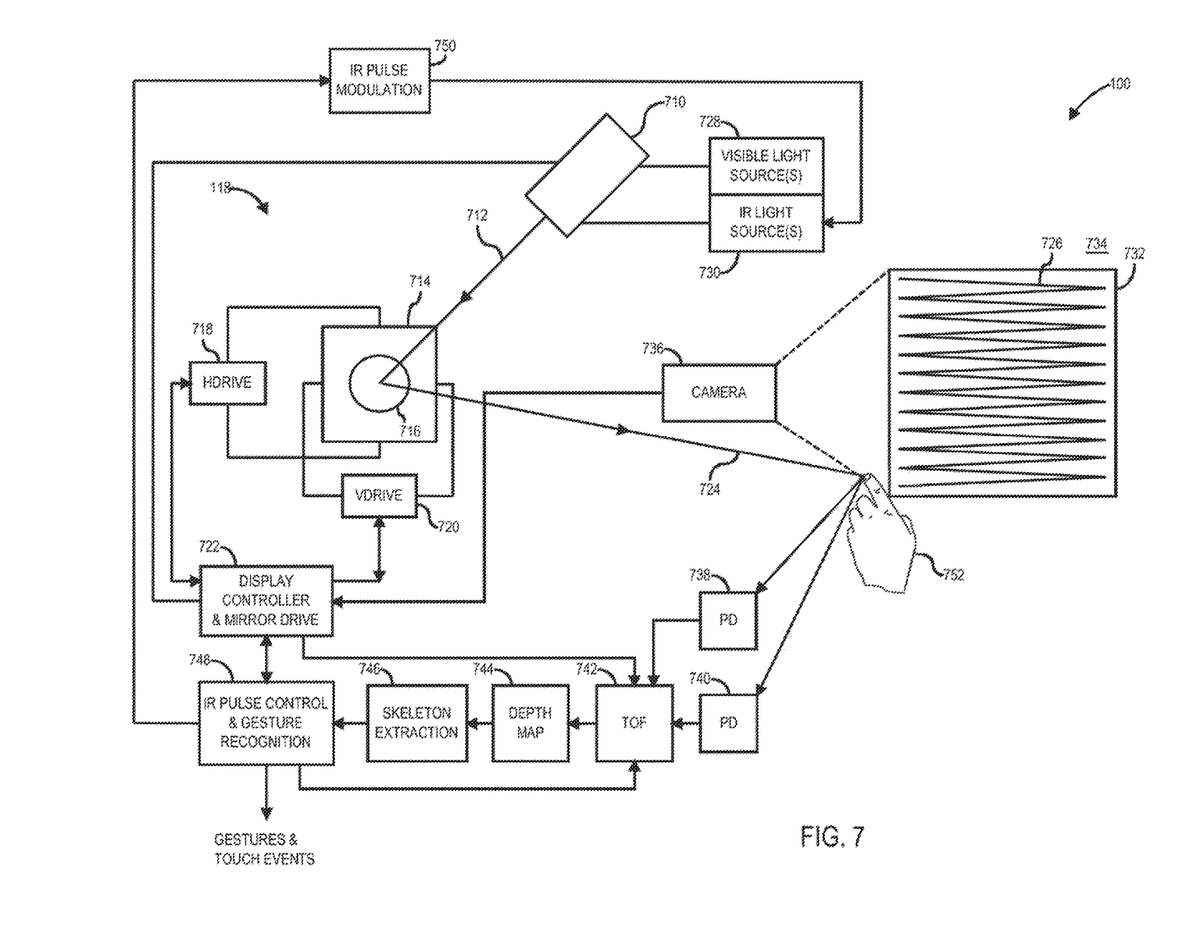
FIG. 7 is a diagram of components of the information handling system of FIG. 1 illustrating beam interactivity in accordance with one or more embodiments.

Referring now to FIG. 7, a diagram of components of the information handling system of FIG. 1 illustrating beam interactivity in accordance with one or more embodiments will be discussed. In the example shown in FIG. 7, information handling system 100 may comprise or otherwise include the components of a microelectromechanical systems (MEMS) scanned beam projector to realize the scanning/modulating system 118 of FIG. 1. Although FIG. 7 shows a MEMS scanned beam projector as one embodiment of scanning/modulating system 118 for purposes of example and discussion, it should be noted that the subject matter discussed herein may be utilized with displays other than a scanned beam display, and the scope of the claimed subject matter is not limited in this respect. As shown in FIG. 7, scanning/modulating system 118 may comprise a light source 710, which may be a laser light source such as a laser or the like, capable of emitting a beam 712 which may comprise a laser beam. The light source 710 may comprise one or more visible light sources 728 and/or one or more invisible light sources 730, for example to realize the N number light sources as shown in FIG. 1. The beam 712 impinges on a scanning platform 714 which may comprise a microelectromechanical systems (MEMS) based scanning platform or the like, and reflects off of scanning mirror 716 to generate a controlled output beam 724. The controlled output beam 724 may correspond to the multi-component beam 120 of FIG. 1. A horizontal drive circuit 718 and a vertical drive circuit 720 modulate the direction in which scanning mirror 716 is deflected to cause output beam 724 to generate a raster scan (or scan pattern) 726, thereby creating a displayed image 732 on a projection surface 734.

It should be noted that although a raster scan is shown and discussed herein as one example scan pattern for purposes of discussion and example, other scanning patterns likewise may be utilized other than a raster scan, for example a Lissajous pattern, and the scope of the claimed subject matter is not limited in this respect. A display controller 722 controls horizontal drive circuit 718 and vertical drive circuit 720 by converting pixel information of the displayed image into laser modulation synchronous to the scanning platform 714 to write the image information as displayed image 732 based upon the position of the output beam 724 in raster scan (or scan pattern) 726 and the corresponding intensity and/or color information at the corresponding pixel in the image 732. Display controller 722 also may control other various functions of scanning/modulating system 118. It should be noted that the MEMS scanning platform is not limited to a single scanning mirror system. In some embodiments, the scanning platform 714 may comprise multiple mirrors 716 to effect fully or at least in part the deflection expected in a certain axis. In such a case, the drive circuitry would be distributed between the multiple mirrors for the plane or axis of deflection. Furthermore, the mirrors in the MEMS scanning platform 714 may be actuated either electromagnetically, electrostatically, or in a hybrid or other manner for each of the axes of deflection. The MEMS scanning platform 714 described herein is not a limitation of the claimed subject matter.

In one or more particular embodiments, the scanning/modulating system 118 as shown in FIG. 1 may comprise a pico-display developed by Microvision, Inc., of Redmond, Wash., USA, referred to as PicoP®. In such embodiments, the light source 710 of such a pico-display may comprise one red, one green, and one blue laser, with a lens near the output of the respective lasers that collects the light from the laser and provides a very low numerical aperture (NA) beam at the output. It should be noted that although the light source 710 discussed herein for purposes of example includes a red, a green, and a blue light source (RGB), light source 710 alternatively may include various other colors, both in the visible and/or in the invisible light spectrum, for example any color of lasers having wavelengths ranging from infrared to near ultraviolet or ultraviolet, and the scope of the claimed subject matter is not limited in this respect. The light from the lasers may then be combined with dichroic elements into a single white beam 712. Using a beam splitter and/or basic fold-mirror optics, the combined beam 712 may be relayed onto a mirror 716 of a biaxial MEMS scanning platform 714 that scans the output beam 724 in a raster scan (or scan pattern) 726. Modulating the lasers synchronously with the position of the scanned output beam 724 may create the projected image 732. In one or more embodiments the scanning/modulating system 118, or engine, may be disposed in a single module known as an Integrated Photonics Module (IPM), which in some embodiments may be 6 millimeters (mm) in height and less than 5 cubic centimeters (cc) in total volume, although the scope of the claimed subject matter is not limited in these respects.

In one or more embodiments, the scanning/modulating system 118 may include a camera 736 or other image detecting device to capture at least a portion of the projected image 732, and/or any other objects in the field of view. The image data captured by camera 736 may be provided to display controller 722 to provide for image processing and control, and/or to facilitate depth and/or gesture detection in the viewports as discussed herein. In some embodiments, light source 710 may include an invisible light source such as an infrared light source that may project an infrared beam or component of beam 724, for example as a component of multi-component beam 120 of FIG. 1. Such a beam may be invisible so as to not be noticeable by the user during viewing of image 732 in viewport 1 or in the other viewports. The invisible light portion of image 732 may be detected by camera 726 as part of a gesture and/or depth detection system as discussed herein.

In one or more embodiments, information handling system 100 may include a Time of Flight (TOF) depth detecting system to detect gestures in any of the viewports shown in FIG. 2, FIG. 3, or FIG. 4, above. For example, information handling system 100 may include a first photodetector 738 to detect gestures in viewport 2, and second photodetector 740 to detect gestures in viewport 3. The IR pulse control and gesture recognition circuit 748 provides the IR pulse modulation circuit 750 to cause the IR light sources 730 to be pulsed in appropriate patterns to be projected into one or more desired viewports such as viewport 2 and viewport 3 as components of the output beam 724 corresponding to the multi-component beam 120 of FIG. 1. The pulsed IR beams may be reflected off an object in the view port, for example off a finger or hand 752 of a user, and the reflected IR beam pulses are redirected to the photodetectors to generate an electrical signal in response to the input IR beam pulses. The outputs of the photodetectors are provided to a TOF circuit 742 which detects the depth of objects in field 412 of viewport 2 and the depth of objects in field 414 of viewport 3 via TOF techniques. From the TOF information, a depth map may be generated via depth map circuit 744, and skeleton extraction may be obtained via skeleton extraction circuit 746 to provide information to an IR pulse control and gesture recognition circuit 748 which uses the depth map and skeleton extraction information to recognize gestures as input controls to an operating system as gestures and touch events. One example of how gesture control input may be implemented is shown in and describe in U.S. Pat. No. 9,002,058 issued Apr. 7, 2015, which is hereby incorporated herein by reference in its entirety, although the scope of the claimed subject matter is not limited in this respect.

Figure 8:
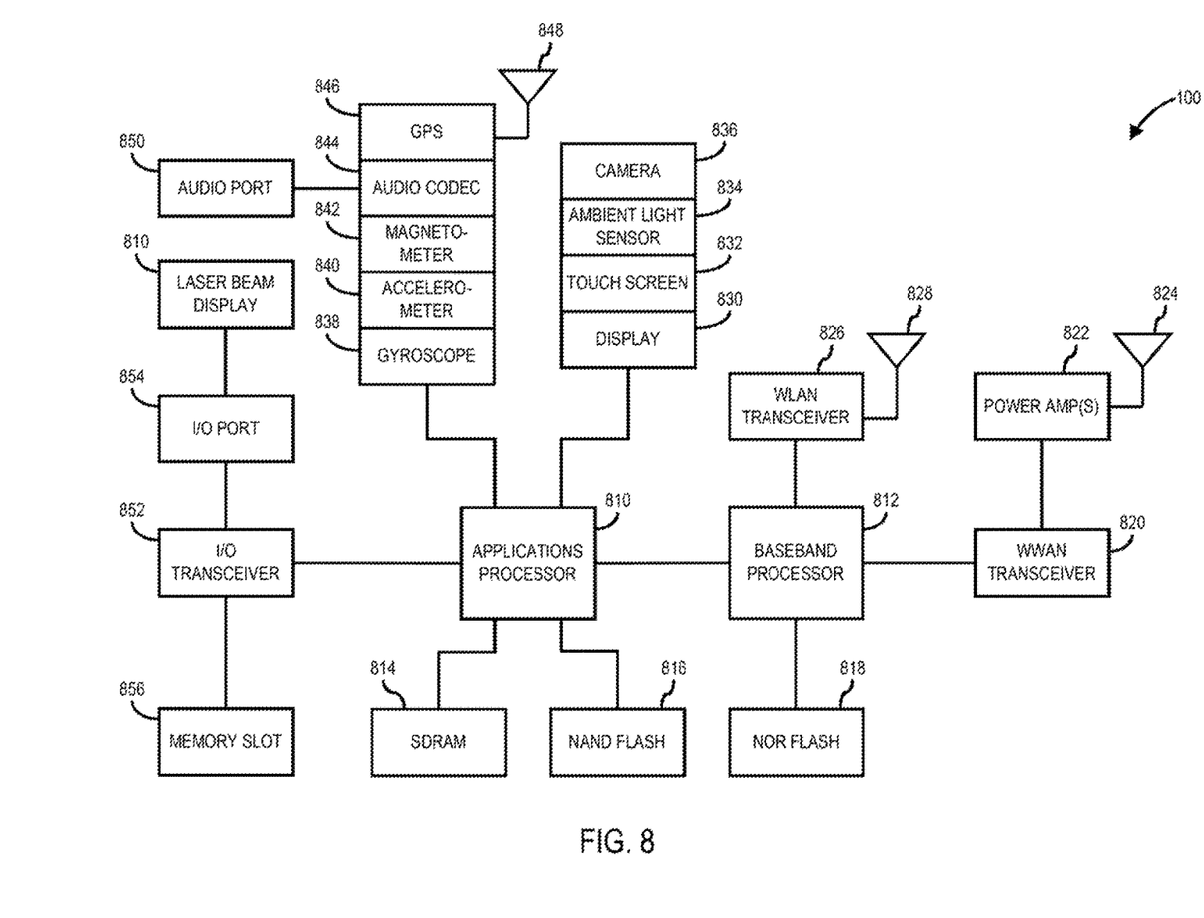
FIG. 8 is a block diagram of an information handling system capable of implementing optical steering of component wavelengths of a multi-wavelength beam to enable interactivity or other applications enabled by depth sensing, in accordance with one or more embodiments.

Referring now to FIG. 8, a block diagram of an information handling system capable of implementing optical steering of component wavelengths of a multi-wavelength beam to enable interactivity in accordance with one or more embodiments will be discussed. Although information handling system 100 represents one example of several types of computing platforms, such as a smartphone, tablet, hand held gaming device, personal computer or the like, information handling system 100 may include more or fewer elements and/or different arrangements of elements than shown in FIG. 8, and the scope of the claimed subject matter is not limited in these respects. Information handling system 100 may utilize scanning/modulating system 118 for example as a projector to project selected wavelength components of a multi-component beam 120 into one or more viewports as described herein, and the scope of the claimed subject matter is not limited in these respects.

In one or more embodiments, information handling system 100 may include an applications processor 810 and a baseband processor 812. Applications processor 810 may be utilized as a general purpose processor to run applications and the various subsystems for information handling system 100. Applications processor 810 may include a single core or alternatively may include multiple processing cores, for example wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 100 is powered off In one or more embodiments, instructions to operate or configure the information handling system 100 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 100. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a Third Generation (3G) or Fourth Generation (4G) network or the like or beyond, for example a Long Term Evolution (LTE) network. The WWAN transceiver 820 couples to one or more power amps 822 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth, and/or an amplitude modulation (AM) or frequency modulation (FM) radio standard including an IEEE 802.11a/b/g/n standard or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information handling system 100 is operating, for example to control a brightness or contrast value for display 830 as a function of the intensity of ambient light detected by ambient light sensor 834. One or more cameras 1536 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 100. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects. In one or more embodiments, the laser beam display 810 may be coupled to one or more of the I/O transceivers 852 and may be integrated within a housing of information handling system 100 or alternatively may be disposed exterior to the housing, although the scope of the claimed subject matter is not limited in these respects.

Figure 9:
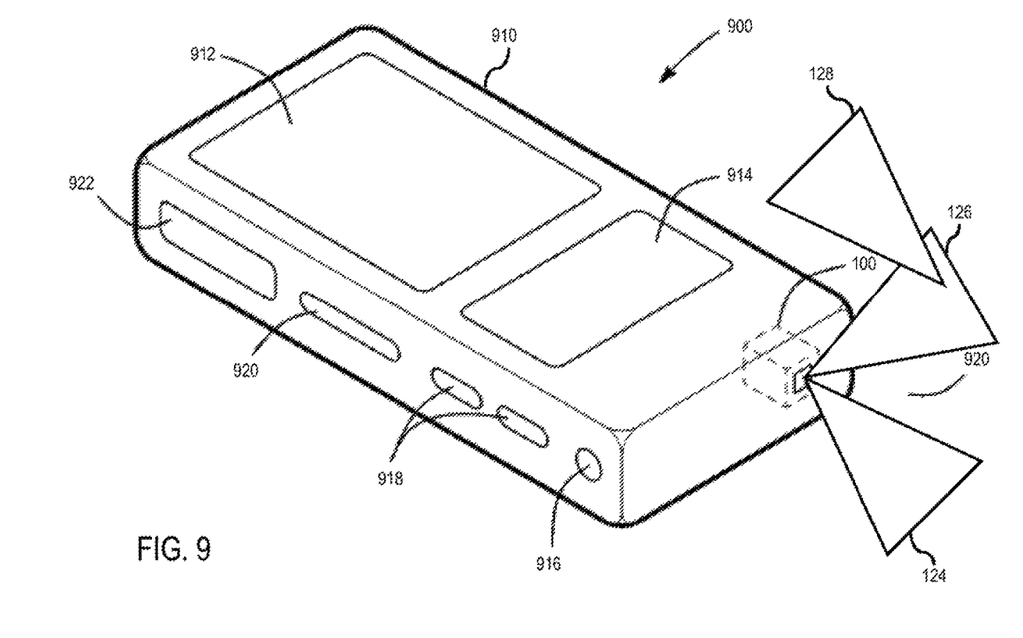
FIG. 9 is an isometric view of an information handling system that includes a MEMS laser beam scanning display utilizing optical steering of component wavelengths in accordance with one or more embodiments.

Referring now to FIG. 9, an isometric view of an information handling system as shown in FIG. 10 in accordance with one or more embodiments will be discussed. The information handling system 900 of FIG. 9 may represent a tangible embodiment of the information handling system 100 of FIG. 1 and/or FIG. 8. Information handling system 900 may comprise any of several types of computing platforms, including cell phones, personal digital assistants (PDAs), netbooks, notebook computers, internet browsing devices, tablets, pads, and so on, and the scope of the claimed subject matter is not limited in these respects. In the example shown in FIG. 9, information handling system 900 may comprise a housing 910 to house scanning/modulating system 118 as discussed herein, to steer one or more wavelength components into one or more viewports corresponding to FOV 124, FOV 126, and/or FOV 128 as discussed herein. Information handling system 900 optionally may include a display 912 which may be a touch screen display, keyboard 914 or other control buttons or actuators, a speaker or headphone jack 916 with optional microphone input, control buttons 918, memory card slot 920, and/or input/output (I/O) port 922, or combinations thereof. Furthermore, information handling system 900 may have other form factors and fewer or greater features than shown, and the scope of the claimed subject matter is not limited in these respects.

Figure 10:
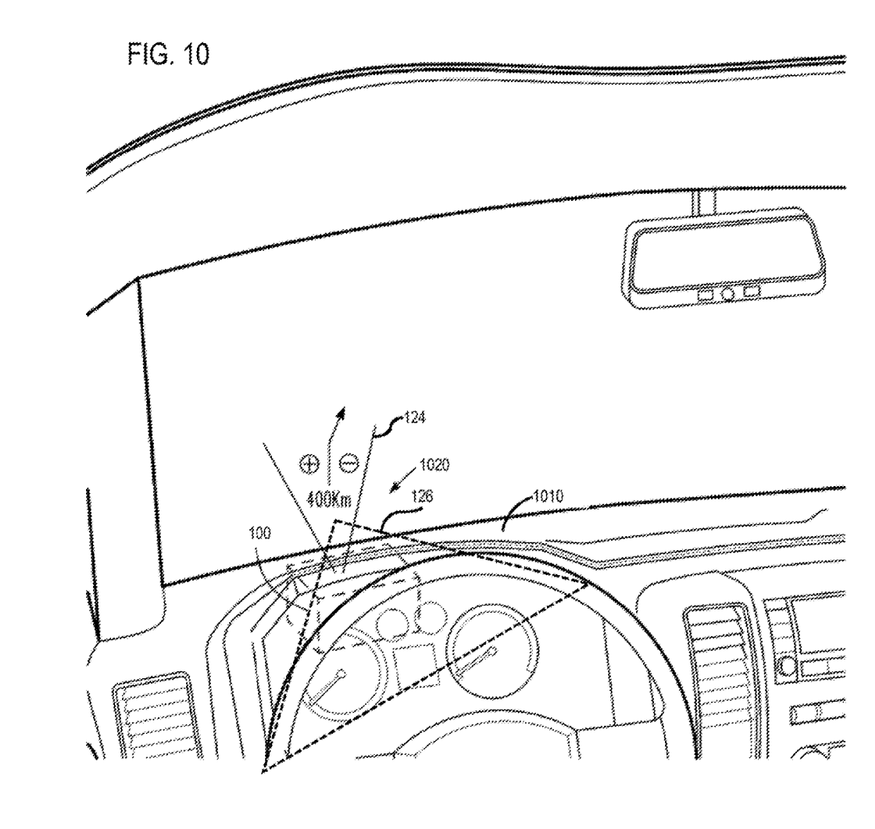
FIG. 10 is a diagram of a vehicle having a head-up display (HUD) in accordance with one or more embodiments.

Referring now to FIG. 10, a diagram of a vehicle that includes a display utilizing information handling system 100 in a head-up display (HUD) in accordance with one or more embodiments will be discussed. In the embodiment shown in FIG. 10, information handling system 100 may be deployed in a vehicle 1010 such as in the dashboard of the automobile 1010, and which may project an image 1020 in FOV 124 corresponding to viewport 1 that may be viewable by an operator or passenger of the vehicle for example near the windshield. One or more component beam wavelengths may be redirected to FOV 126 corresponding to viewport 2 as discussed herein. Based on the method of depth sensing or interactivity implemented, advanced features such as driver gaze detection or gesture recognition can be implemented in the appropriate redirected FOV or viewport. Although FIG. 10 shows one example deployment of an information handling system 100, other types of deployments likewise may be provided, and the scope of the claimed subject matter is not limited in this respect.

Figure 11:
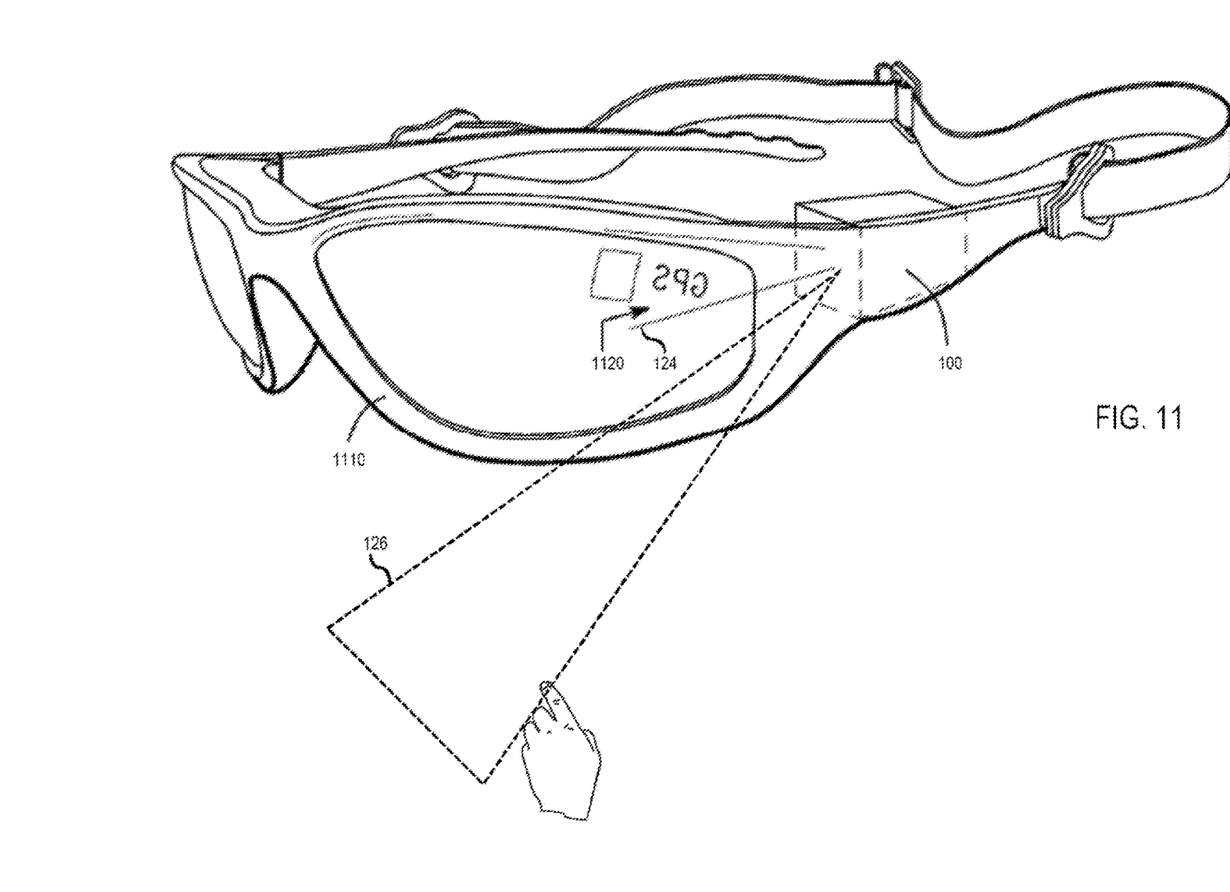
FIG. 11 is a diagram of eyewear that includes a head-mounted display (HMD) in accordance with one or more embodiments.

Referring now to FIG. 11, a diagram of eyewear that includes information handling system 100 in a head-mounted display (HMD) in accordance with one or more embodiments will be discussed. In the embodiment shown in FIG. 11, the information handling system 100 may be deployed in eyewear 1110 or other head worn device, for example attached to a frame of the eyewear 1110, and which may project an image 1120 that may be viewable by the wearer of the eyewear 1110 in FOV 124 corresponding to viewport 1. Interactivity may be provided with one or more component wavelengths redirected to FOV 126 corresponding to viewport 2. Although FIG. 11 shows one example deployment information handling system 100, other types of deployments likewise may be provided, and the scope of the claimed subject matter is not limited in this respect.

Figure 12:
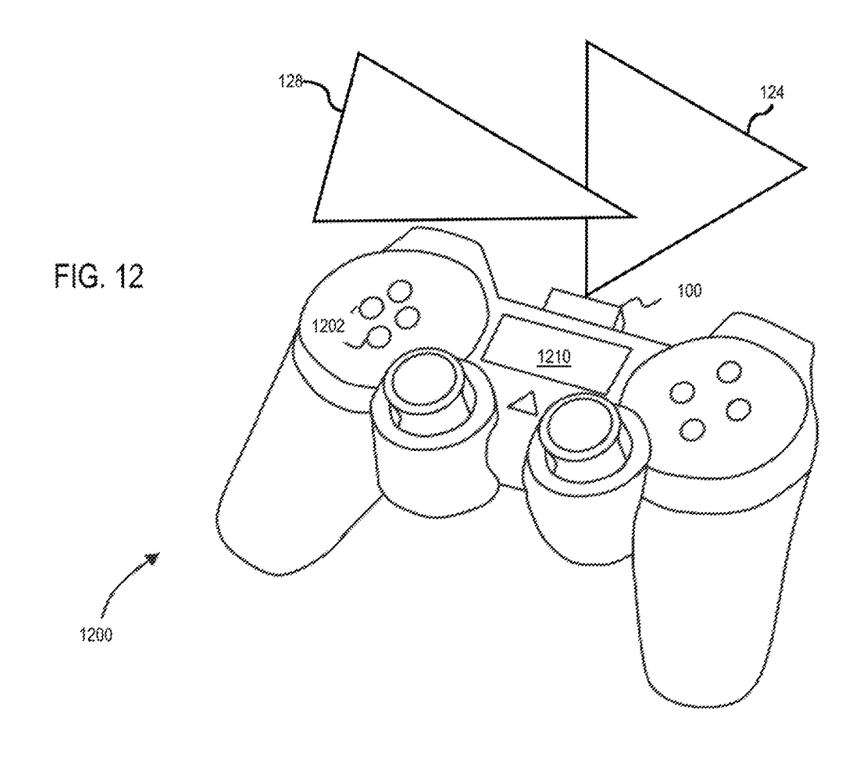
FIG. 12 is a diagram a gaming apparatus in accordance with one or more embodiments.

Referring now to FIG. 12, a diagram a gaming apparatus in accordance with one or more embodiments will be discussed. Gaming apparatus 1200 includes buttons 1202, display 1210, and information handling system 100. In some embodiments, gaming apparatus 1200 is a standalone apparatus that does not need a larger console for a user to play a game. For example, a user may play a game while watching display 1210 and/or the projected content in FOV 124 corresponding to viewport 1, and further may interact with the gaming apparatus 1200 via one or more component beams redirected to FOV 128 corresponding to viewport 2. In other embodiments, a user may watch a larger screen tethered to a console in combination with watching display 1210 and/or projected content at FOV 124 while interacting in FOV 128.

Although the claimed subject matter has been described with a certain degree of particularity, it should be recognized that elements thereof may be altered by persons skilled in the art without departing from the spirit and/or scope of claimed subject matter. It is believed that the subject matter pertaining to optical steering of component wavelengths of a multi-wavelength beam to enable interactivity and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An information handling system, comprising:
  a plurality of laser light sources configured to generate a plurality of component wavelength beams;
  a scanning system configured to combine the plurality of component wavelength beams into a combined multi-component beam and scan the combined multi-component beam into a scan pattern; and
  a redirecting system to redirect a second subset of the plurality of component wavelength beams from the combined multi-component beam into a second field of view while a first subset of the plurality of component wavelength beams is directed from the combined multi-component beam into a first field of view, wherein the redirecting system redirects the second subset of the plurality of component wavelength beams based on wavelength such that first subset of the plurality of component wavelength beams has a different wavelength distribution than the second subset of the plurality of component wavelength beams;

wherein the first subset of the plurality of component wavelength beams is projected in the first field of view to provide a first function, and the second subset of the plurality of component wavelength beams is projected in the second field of view to provide a second function.

2. The information handling system as claimed in claim 1, wherein at least one of the first or the second function comprises providing a visible image, providing capability to receive an input from a user to control the information handling system, or scene acquisition, or a combination thereof.

3. The information handling system as claimed in claim 1, wherein the redirecting system comprises a beam splitter having a first surface that is transmissive for the first subset of the plurality of component wavelength beams and is reflective for the second subset of the plurality of component wavelength beams.

4. The information handling system as claimed in claim 1, wherein the first subset comprises one or more visible wavelength beams, and the second subset comprises one or more invisible wavelength beams.

5. The information handling system as claimed in claim 1, wherein the redirecting system comprises a beam splitter to allow transmission of the first subset into the first field of view, and to reflect the second subset into the second field of view.

6. The information handling system as claimed in claim 5, wherein the beam splitter has at least one filter that is transmissive for the first subset and reflective for the second subset.

7. The information handling system as claimed in claim 1, wherein the redirecting system is configured to redirect a third subset of the one or more component wavelength beams into a third field of view.

8. The information handling system as claimed in claim 1, further comprising a time of flight (TOF) system to detect a depth of an object in the second field of view to provide gesture recognition or touch input recognition, or a combination thereof.

9. An information handling system, comprising:
   a plurality of laser light sources configured to generate a plurality of component wavelength beams;
   a scanning system configured to combine the plurality of component wavelength beams into a combined multi-component beam and scan the combined multi-component beam into a scan pattern; and
   a steering system to steer a second subset of the plurality of the component wavelength beams from the combined multi-component beam into a second field of view while a first subset of the plurality of component wavelength beams is directed from the combined multi-component beam into a first field of view, wherein the steering system steers the second subset of the plurality of component wavelength beams based on wavelength such that first subset of the plurality of component wavelength beams has a different wavelength distribution than the second subset of the plurality of component wavelength beams;
   wherein the first subset of the plurality of component wavelength beams is projected in the first field of view to provide a visible image in the first field of view, and the second subset of the plurality of component wavelength beams is projected in the second field of view to generate a depth map of the second field of view to receive an input from a user in the second field of view.

10. The information handling system as claimed in claim 9, wherein the steering system comprises a beam splitter having a first surface that is transmissive for the first subset of the plurality of component wavelength beams and is reflective for the second subset of the plurality of component wavelength beams.

11. The information handling system as claimed in claim 9, wherein the first subset comprises one or more visible wavelength beams, and the second subset comprises one or more invisible wavelength beams.

12. The information handling system as claimed in claim 9, wherein the steering system comprises a beam splitter to allow transmission of the first subset into the first field of view, and to reflect the second subset into the second field of view.

13. The information handling system as claimed in claim 12, wherein the beam splitter has at least one filter that is transmissive for the first subset and reflective for the second subset.

14. The information handling system as claimed in claim 9, wherein the steering system is configured to steer a third subset of the one or more component wavelength beams into a third field of view.

15. The information handling system as claimed in claim 9, further comprising a time of flight (TOF) system to generate the depth map of the second field of view to receive the input from the user, wherein the input from the user includes gesture recognition.

16. A method to optically steer component wavelengths of a multi-wavelength beam, comprising:
   generating a plurality of component wavelength beams;
   combining the plurality of component wavelength beams into a multi-wavelength beam;
   projecting the multi-wavelength beam in a scan pattern;
   filtering the projected multi-wavelength beam based on wavelength to create a filtered group of one or more wavelengths and a non-filtered group of the one or more wavelengths, wherein the non-filtered group of the one or more wavelengths has at least one component wavelength different than the filtered group of the one or more wavelengths, wherein the non-filtered group of one or more wavelengths from the multi-wavelength beam are transmitted in a first direction to a first viewport to provide a first function; and
   redirecting the filtered group in a second direction to a second viewport; and
   receiving a reflected beam from the second viewport as an input signal to provide a second function.

17. The method as claimed in claim 16, wherein a user may interact with the filtered group in the second viewport to control the reflected beam without interfering with the first viewport.

18. The method as claimed in claim 16, further comprising:
   measuring a time of flight (TOF) of the reflected beam to yield a depth map;
   analyzing the depth map to extract information in the input signal as gesture or touch information, or a combination thereof.

19. The method as claimed in claim 16, wherein the non-filtered group comprises one or more visible wavelength beams to form an image in the first viewport, and the filtered group comprises one or more invisible wavelength beams to facilitate depth sensing in the second viewport.

* * * * *